United States Patent [19]

Moret de Rocheprise et al.

[11] Patent Number: 5,382,399
[45] Date of Patent: Jan. 17, 1995

[54] METHOD FOR THE PRODUCTION OF FLUORINATED RESIN TUBES, PARTICULARLY OF POLYTETRAFLUOROETHYLENE

[75] Inventors: Bernard Moret de Rocheprise, Chalindrey; Tisserand Serge, Chanoy; Pascal Dugand, Chaumont, all of France

[73] Assignee: Compagnie Plastic Omnium, Lyons, France

[21] Appl. No.: 918,657

[22] Filed: Jul. 22, 1992

[30] Foreign Application Priority Data

Jul. 26, 1991 [FR] France .................. 91 09516

[51] Int. Cl.$^6$ .................................. B29C 53/60
[52] U.S. Cl. ............................ 264/127; 156/190; 156/195; 264/103
[58] Field of Search ........... 264/241, 127, 103; 138/76; 156/149, 184, 190, 195, 196, 194

[56] References Cited

U.S. PATENT DOCUMENTS

| 2,713,383 | 7/1955 | Kennedy | 156/190 |
| 2,783,173 | 2/1957 | Walker et al. | 156/190 |
| 2,814,313 | 11/1957 | Tate et al. | 138/76 |
| 2,932,597 | 4/1960 | St. John et al. | 156/195 |
| 3,700,520 | 10/1972 | Hielema | 156/195 |
| 3,810,803 | 5/1974 | Karp et al. | 156/190 |
| 5,207,960 | 5/1993 | Moret de Rocheprise | 264/127 |

FOREIGN PATENT DOCUMENTS

| 2218987 | 9/1974 | France . | |
| 2409178 | 8/1974 | Germany | 264/127 |

*Primary Examiner*—Mathieu D. Vargot
*Attorney, Agent, or Firm*—Schweitzer Cornman & Gross

[57] ABSTRACT

A process for the manufacture of tubes made of fluoro resin, especially of polytetrafluoroethylene, which can be employed especially as corrosion-resistant coatings for piping components, in particular those made of steel, for conveying chemical products.

9 Claims, 2 Drawing Sheets

METHOD FOR THE PRODUCTION OF FLUORINATED RESIN TUBES, PARTICULARLY OF POLYTETRAFLUOROETHYLENE

The present invention relates to a process for the manufacture of tubes made of fluoro resin, especially of polytetrafluoroethylene (PTFE), which can be employed especially as corrosion-resistant coatings for piping components, in particular those made of steel, for conveying chemical products.

BACKGROUND OF THE INVENTION

The process according to the present invention is of the type described in the Compagnic Plastic Omnium Patent French Patent No. 2,218,987 and comprises the stages of winding a tape of fluoro resin onto a mandrel, particularly of raw PTFE, obtained such as by lubricated extrusion and calendering, winding of the tape in a plurality of layer, heating the tape thus wound onto the mandrel to a temperature above the gelling temperature of the fluoro resin for a sufficient time to cause gelling, cooling the tube and the mandrel and withdrawing the mandrel situated inside the tube.

In the prior document the winding of the turns onto the mandrel is carried out so that the axis of the tape forms an angle of between approximately 45° and 90° with the axis of the tube, the successive windings being preferably carried out with turns of opposite direction so as to alternate the inclinations of the layers of tape to the axis of the tube.

While being satisfactory from the viewpoint of mechanical strength, nevertheless, with some chemical products which are conveyed, the tubes formed in this way exhibit a disadvantage related to phenomena of diffusion through the wall of the tube as a result of interstices which remain along the edges of the wound tape at crossovers between the layers wound at different winding angles.

The present invention proposes to provide a process for the manufacture of tubes made of fluoro resin, especially of polytetrafluoroethylene, which constitutes an improvement to the process described previously by avoiding the abovementioned disadvantages.

SUMMARY OF THE PRESENT INVENTION

The process according to the invention is essentially characterised by the fact that a first winding is produced on the mandrel, of approximately 30 to 100 layers of tape with a winding angle between the axis of the tape and that of the tube close to 90°, with large overlapping of the turns, and that a second winding is then produced on the said first winding, with an angle between the axis of the tape and that of the tube which is between approximately 45° and approximately 90°, the second winding being produced with turns which do not join and with alternation of the winding angles between two successive layers, the said second winding being continued until the desired total tube thickness is obtained.

The tape employed in carrying out the process according to the invention advantageously has a width of between approximately 20 mm and approximately 100 mm, a thickness of between approximately 50 and approximately 100 μm and a relative density of between approximately 1.5 and approximately 1.8.

To make the invention better understood, an embodiment thereof will now be described with reference to the drawing, no limitation being implied.

DETAILED DESCRIPTION OF THE INVENTION

Figure 1:
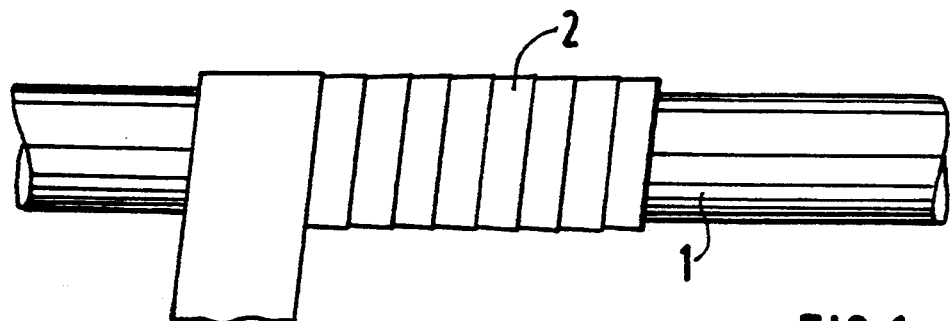
FIG. 1 illustrates diagrammatically the application of the first winding of the process according to the invention.
Figure 2:
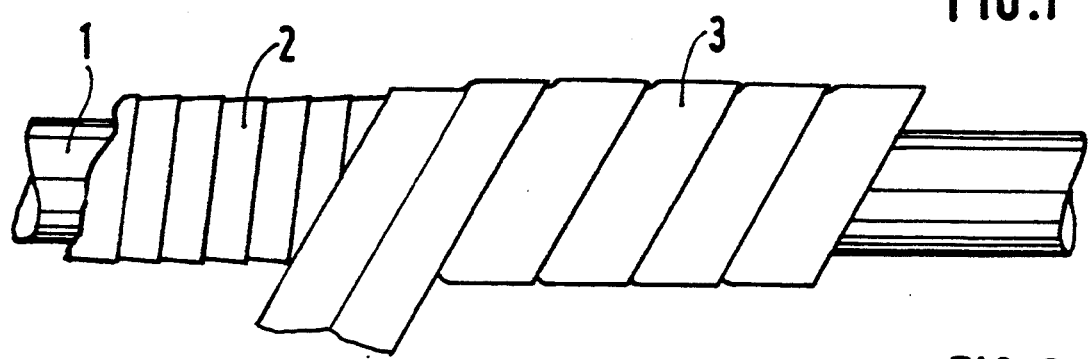
FIG. 2 illustrates the production of the second winding.
Figure 3:
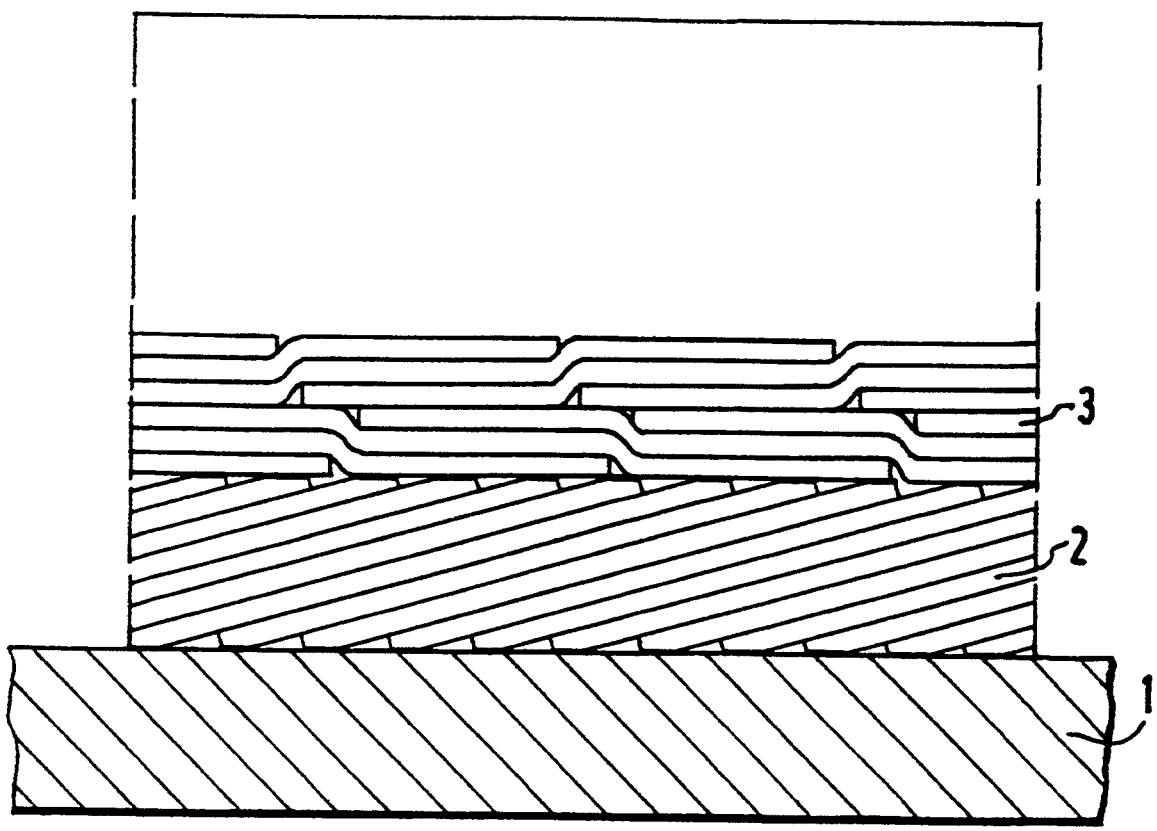
FIG. 3 shows diagrammatically a partial axial section on a larger scale of the structure obtained by applying the windings in accordance with FIGS. 1 and 2.

To carry out the process according to the invention a first winding 2 of an extruded and calendered tape of fluoro resin, especially of raw PTFE, is carried out on a mandrel 1, the winding being performed with large overlap and then, as illustrated in FIG. 2, a second winding 3 is produced on the first winding, the winding being performed with overlapping by successive layers with winding angles which differ from one layer to another. The stack of the layers of windings 2 and 3 on the mandrel 1 is illustrated in FIG. 3.

Figure 4:
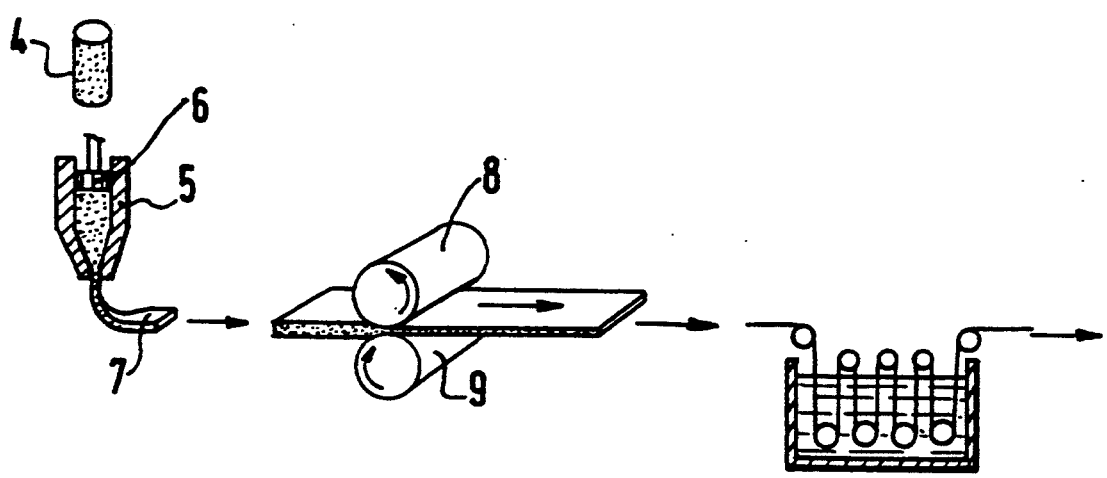
FIG. 4 illustrates diagrammatically the process used to obtain the tape employed in the process according to the invention.

FIG. 4 illustrates diagrammatically the manufacture of the tape which can be employed according to the invention.

First of all a preform 4 is produced, obtained by compression of a mixture of fine fluoro resin powder, especially of PTFE and lubricant. This preform 4 is introduced into an extrusion press 5 in which a plunger 6 expels the mixture through a die so as to obtain a flat tape 7.

This tape 7 is then rolled between two rolls 8, 9 to obtain a thin tape.

The rolling takes place with virtually no change in the width of the tape, which, on the contrary, undergoes a considerable elongation.

The lubricant is then removed. Depending on the nature of the lubricant, this removal is performed either by heating or by passing the tape through a trough containing solvent.

An example of embodiment of tube according to the invention will now be described.

EXAMPLE

A virgin PTFE powder obtained by coagulation of an aqueous dispersion followed by drying is employed. This powder is mixed with an isoparaffin lubricant (Isopar) in a proportion of approximately 20% by weight of lubricant.

A preform is produced by compressing the mixture of powder and lubricant at a pressure of 15 kg/cm$^2$. This preform, which takes the form of a cylinder 18 cm in length and 6 cm in diameter, is introduced into an extrusion press to form a tape which has a thickness of approximately 1 mm. This tape has a relative density of approximately 1.6.

The tape thus prepared is calendered so as to obtain a tape which has a thickness of 75 μm.

The tape is then heated to remove the lubricant.

The tape thus obtained has a relative density of 1.65 and is then trimmed to a width of 60 mm.

The first winding of the tape is carried out on a mandrel which has a diameter of 50 mm with a pitch of 2 mm.

25 layers are thus formed, producing a total thickness of 1.87 mm in the case of the first winding.

After this first winding has been performed, the second winding is produced with a pitch of 12.5 mm.

Thus, at each winding traverse, a superposition of four layers of tape is produced and the windings are alternated so as to produce a cross-over of the wound layers.

A second winding with a total thickness of 3 mm is produced in this way.

After the two windings have been performed, the mandrel and its coating of PTFE tape are heated in an oven at 370° C. This temperature is maintained for 1 hour 30 min, after which rapid cooling to room temperature is carried out.

The tube obtained has a thickness of 3.75 mm and a relative density of 2.15.

Finally, the mandrel is withdrawn from the inside of the tube formed.

The tube formed was installed as an internal lining of a metal tube and was then subjected to the proving test recommended by ASTM standard F 423 "Standard Specification for PTFE Plastic-lined Ferrous Metal Pipes, Fittings and Flanges" published in September 1982. After the hundred successive cycles, specified by this standard, of injections of saturated steam and of cold water, no fault was observed in the PTFE tube forming the internal lining. In particular no evidence of a "blister" water pocket in the PTFE tube was found.

Although the invention has been described in connection with a particular embodiment, it is quite obvious that it is not limited thereto in any way whatever and that various alternative forms and modifications can be introduced therein without thereby departing either from its scope or from its spirit.

We claim:

1. A process for producing a tube from a synthetic material, the tube having a predetermined wall thickness, which comprises winding a first layer of a tape of a synthetic material and having a longitudinal axis over a mandrel having a longitudinal axis, to produce a first layer in which each turn of the tape overlaps a large majority of the width of the tape of an adjacent turn, and wherein the angle between the longitudinal axis of the mandrel and the tape is close to 90°, said first layer having no helical interstices between the turns, and winding a plurality of subsequent layers of tape over said first layer wherein said angle is between about 45° and less than 90°, with the turns of each subsequent layer overlapping each other to a substantially lesser extent than the turns of said first layer, in winding said plurality of subsequent layers, adjacent layers of subsequent layers are wound at different angles, and continuing winding said plurality of subsequent layers until the predetermined wall thickness is produced, and then completing the fabrication of the tube.

2. The process of claim 1, wherein adjacent subsequent layers are wound with the angles alternating between the layers.

3. The process of claim 1, wherein said first layer is constituted of from about 30 to about 100 overlaps within one turn of the tape.

4. The process of claim 1, wherein each turn of winding of each subsequent layer is overlapped at four points of the width of the tape.

5. The process of claim 1, wherein said synthetic material is a fluoropolymer.

6. The process of claim 2, wherein said fluoropolymer is polytetrafluoroethylene.

7. The process of claim 3, wherein the relative density of said tape is from about 1.5 to about 1.8.

8. The process of claim 1, wherein said tape has a width of from about 20 mm to about 100 mm, and a thickness of from about 50 $\mu$m to about 100 $\mu$m.

9. The process of claim 1, wherein said tape is obtained by the lubricated extrusion of said synthetic material which is a gellable synthetic material, and then calendaring the extrudate to form the tape, and the completion of the fabrication comprises gelling of the layers of tape wound onto the mandrel by heating it above the gelling temperature of the synthetic material for a sufficient time to cause gelling, cooling the mandrel with the layers of tape wound thereon, and withdrawing the mandrel from within the tube.

* * * * *